US010245946B2

(12) United States Patent
McNally

(10) Patent No.: US 10,245,946 B2
(45) Date of Patent: Apr. 2, 2019

(54) PLATFORM HEAVY DUTY TRANSFER CASE

(71) Applicant: Magna Powertrain of America, Inc., Troy, MI (US)

(72) Inventor: Joseph McNally, Clarkston, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 340 days.

(21) Appl. No.: 15/058,362

(22) Filed: Mar. 2, 2016

(65) Prior Publication Data

US 2016/0325622 A1    Nov. 10, 2016

Related U.S. Application Data

(60) Provisional application No. 62/156,941, filed on May 5, 2015.

(51) Int. Cl.
*B60K 17/346* (2006.01)
*B60K 23/08* (2006.01)
*F16D 23/12* (2006.01)
*F16H 48/00* (2012.01)

(52) U.S. Cl.
CPC .......... *B60K 17/3467* (2013.01); *B60K 23/08* (2013.01); *F16D 23/12* (2013.01); *B60K 2023/0858* (2013.01); *B60W 2720/403* (2013.01); *F16H 2048/02* (2013.01); *F16H 2048/04* (2013.01)

(58) Field of Classification Search
CPC ..... B60K 17/3467; B60K 23/08; F16D 23/12; F16H 2048/02; B60W 2720/403
See application file for complete search history.

(56) References Cited

U.S. PATENT DOCUMENTS

| | | |
|---|---|---|
| 2,395,108 A | 2/1946 | Donley et al. |
| 2,805,586 A | 9/1957 | Lucas |
| 5,950,750 A | 9/1999 | Dong et al. |
| 2002/0137591 A1* | 9/2002 | Frost ................... B60K 17/3467 475/288 |
| 2003/0073536 A1* | 4/2003 | Williams ........... B60K 17/3467 475/204 |
| 2005/0113203 A1* | 5/2005 | Mueller ............. B60K 17/3467 475/223 |
| 2007/0251345 A1* | 11/2007 | Kriebernegg .......... F16H 61/32 74/335 |
| 2010/0107811 A1* | 5/2010 | McCloy ............. B60K 17/3467 74/665 F |
| 2011/0105265 A1* | 5/2011 | Yoshimura ......... B60K 17/3467 475/205 |
| 2012/0021864 A1 | 1/2012 | Ziech et al. |

* cited by examiner

*Primary Examiner* — Jacob S. Scott
*Assistant Examiner* — Tinh Dang
(74) *Attorney, Agent, or Firm* — Dickinson Wright PLLC

(57) ABSTRACT

A two-speed transfer case configured for use in heavy-duty four-wheel drive vehicles and which is equipped with a low-torque power transfer arrangement and a high-torque power transfer arrangement.

5 Claims, 5 Drawing Sheets

PLATFORM HEAVY DUTY TRANSFER CASE

CROSS-REFERENCE TO RELATED APPLICATIONS

This application claims the benefit of U.S. Provisional Application No. 62/156,941 filed May 5, 2015. The entire disclosure of the above applications is incorporated herein by reference.

FIELD

The present disclosure relates generally to power transfer systems for controlling the distribution of drive torque from a powertrain to the front and rear drivelines of a four-wheel drive vehicle. More particularly, the present disclosure relates to a two-speed transfer case configured for use in heavy duty four-wheel drive vehicles and which is equipped with a low torque power transfer arrangement and a high torque power transfer arrangement.

BACKGROUND

This section provides background information related generally to the present disclosure which is not necessarily prior art.

Due to continuing consumer demand for four-wheel drive vehicles, a plethora of different power transfer systems are currently utilized for directing power (i.e., drive torque) to all four wheels of the vehicle. For example, in many "part-time" power transfer systems, a transfer case is installed between the front and rear drivelines and is normally operable in a two-wheel drive mode for only delivering drive torque to the rear wheels. However, when a four-wheel drive mode is desired, a mode shift mechanism is selectively actuated by the vehicle operator for directly coupling the front wheels to the rear wheels for establishing a part-time or locked four-wheel drive mode.

A significant number of the transfer cases are also equipped with a gear reduction unit and a range shift mechanism operable for permitting the vehicle operator to choose between high-range and low-range drive modes. In some instances, the vehicle must be stopped before the transfer case can be shifted between its high-range and low-range drive modes. Unfortunately, the need to stop the vehicle prior to shifting between the high-range and low-range drive modes is inconvenient, particularly upon encountering road conditions or surface terrains where continuation of the vehicle's rolling momentum would assist in overcoming the conditions encountered. To alleviate this inconvenience, some two-speed transfer cases are equipped with a synchronized range shift mechanism from permitting "on-the-move" shifting between the high and low ranges.

It is also known to use "on-demand" power transfer systems for automatically directing power to the front wheels, without any input or action on the part of the vehicle operator, when traction is lost at the rear wheels. Typically, this on-demand feature is incorporated into the transfer case by replacing the mode shift mechanism with a multi-plate clutch assembly and a power-operated clutch actuator that are interactively associated with an electronic control system and a sensor arrangement. During normal road conditions, the clutch assembly is maintained in a non-actuated condition such that drive torque is only delivered to the rear wheels. However, when the sensors detect a low traction condition at the rear wheels, the clutch assembly is automatically actuated to also deliver drive torque to the front wheels. The amount of drive torque transferred through the clutch assembly to the front wheels can be varied as a function of specific vehicle dynamics and operational characteristics detected by the sensors.

Conventional transfer cases are typically engineered for use in regular-duty trucks and passenger-carrying SUVs. Transfer cases are also used in heavy-duty vehicular applications, with such being commensurately sized to accommodate the higher load and torque requirements. However, the recent development of vehicles with lower numerical axle ratios and increased transmission output torques has mandated development of new transfer cases for heavy-duty vehicle application that are capable of accommodating the increased torque requirements. These so-called heavy-duty transfer cases but also typically requiring much larger and heavier components. The lower volumes associated with such heavy-duty transfer cases result in detrimental effects to their overall manufacturing cost and the vehicle's fuel economy and overall weight.

Accordingly, a recognized need exists to develop two-speed heavy duty transfer cases that address and overcome these and other disadvantages associated with conventional transfer cases.

SUMMARY

This section provides a general summary of the present disclosure and is not intended to be an exhaustive and comprehensive listing of all of its aspects, objectives and features.

It is an aspect of the present disclosure to provide a transfer case for use in heavy duty four-wheel drive vehicles that overcomes the known shortcomings of conventional heavy-duty transfer cases and concomitantly advances the field of art related to four-wheel drive systems.

It is a related aspect of the present disclosure to provide a transfer case for heavy duty four-wheel drive vehicles that can be assembled using otherwise available (i.e. platform) components and sub-systems associated with smaller and lighter regular-duty and medium-duty transfer cases for enhanced component commonality and utilization.

In accordance with these and other aspects and objectives of the present disclosure, a two-speed transfer case for heavy-duty vehicular applications is configured to include: a mainshaft adapted to be driven by the output of a powertrain; a rear output shaft adapted to be connected to a rear driveline; a front output shaft adapted to be connected to a front driveline; a transfer mechanism; a rear range mechanism operable for selectively establishing first and second speed ratio drive connections between the mainshaft and the rear output shaft; a mode mechanism operable for selectively transmitting drive torque from the mainshaft to the transfer mechanism; a front range mechanism operable for selectively establishing first and second speed ratio drive connections between the transfer mechanism and the front output shaft; a mode actuator for controlling operation of the mode mechanism; a rear range actuator for controlling operation of the rear range mechanism; and a front range actuator for controlling operation of the front range mechanism.

In accordance with an embodiment of the two-speed transfer case constructed in accordance with the present disclosure, the mode actuator is a power-operated mode shift arrangement and the rear and front range actuators are a common power-operated range shift arrangement.

In accordance with an embodiment of the two-speed transfer case constructed in accordance with the present disclosure, the mode mechanism and the transfer mechanism are associated with a first or low-torque power transfer section while the rear and front range mechanisms are associated with a second or high-torque power transfer section.

In accordance with an embodiment of the two-speed transfer case constructed in accordance with the present disclosure, the mode mechanism is a friction clutch and the mode actuator is power-operated to permit adaptive or on-demand torque transfer between the mainshaft and the transfer mechanism, and wherein the drive torque transmitted via the friction clutch to the transfer mechanism is subsequently transmitted to the front output shaft via the front range mechanism at one of the first and second speed ratios.

In accordance with an embodiment of the two-speed transfer case constructed in accordance with the present disclosure, the rear range mechanism includes a first planetary gearset driven by the mainshaft and a first range shift component moveable between at least two distinct range positions relative to the first planetary gearset to establish the first and second speed ratio drive connections between the mainshaft and the rear output shaft. Additionally, the front range mechanisms includes a second planetary gearset driven by the transfer mechanism, and a second range shift component moveable between at least two distinct range positions to establish the first and second speed ratio drive connections between the transfer mechanism and the front output shaft.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments of transfer cases for use in heavy duty four-wheel drive vehicles will now be described more fully with reference to the accompanying drawings. However, it is to be understood that the disclosed embodiments can take various and alternative forms. The drawings are not necessarily to scale with some features exaggerated or minimized to show details of particular components. Therefore, specific structural and functional details disclosed herein are not to be interpreted as limiting, but merely as a representative basis for teaching one skilled in the art to employ the inventive concepts and arrangements associated with the present disclosure. As those skilled in the art will understand, various features illustrated and described with reference to any one of the drawings can be combined with features illustrated in one or more other drawings to produce embodiments that are not expressly illustrated or described. The combination of features illustrated provide representative embodiments for typical applications.

Figure 1:
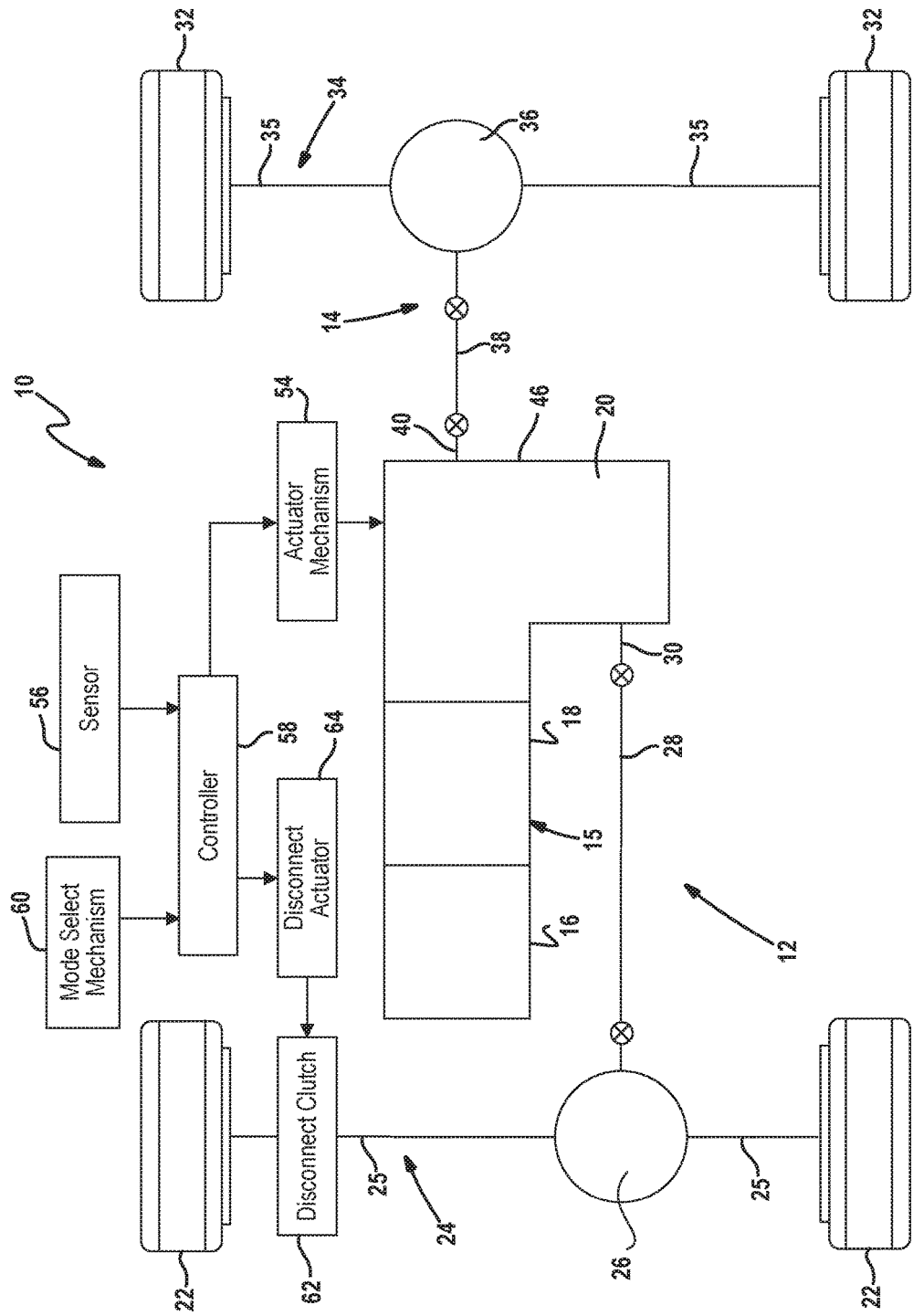
FIG. 1 is a schematic representation of a four-wheel drive motor vehicle equipped with a heavy-duty transfer case constructed in accordance with the teachings of the present disclosure.

Referring now to FIG. 1 of the drawings, a drivetrain for a four-wheel drive vehicle is schematically shown interactively associated with a power transfer system 10 which incorporates one or more products or assemblies embodying the teachings of the present disclosure. The example motor vehicle drivetrain generally includes a front driveline 12 and a rear driveline 14 both driveable from a source of rotary power. In the non-limiting arrangement shown, the source of power is a powertrain 15 comprised of an internal combustion engine 16 and a transmission 18. In the particular embodiment shown, the drivetrain also includes a transfer case 20 configured for transmitting rotary power (i.e. drive torque) from powertrain 15 to front driveline 12 and rear driveline 14. Front driveline 12 is shown to include a pair of front ground-engaging wheels 22 connected at opposite ends of a front axle assembly 24 having front axle shafts 25 and a front differential unit 26. Front driveline 12 also includes a front propshaft 28 interconnecting a front output shaft 30 of transfer case 20 to front differential unit 26. Similarly, rear driveline 14 is shown to include a pair of rear ground-engaging wheels 32 connected at opposite ends of a rear axle assembly 34 having rear axle shafts 35 and a rear differential unit 36. Rear driveline 14 further includes a rear propshaft 38 interconnecting a rear output shaft 40 of transfer case 20 to rear differential unit 36.

Figure 2:
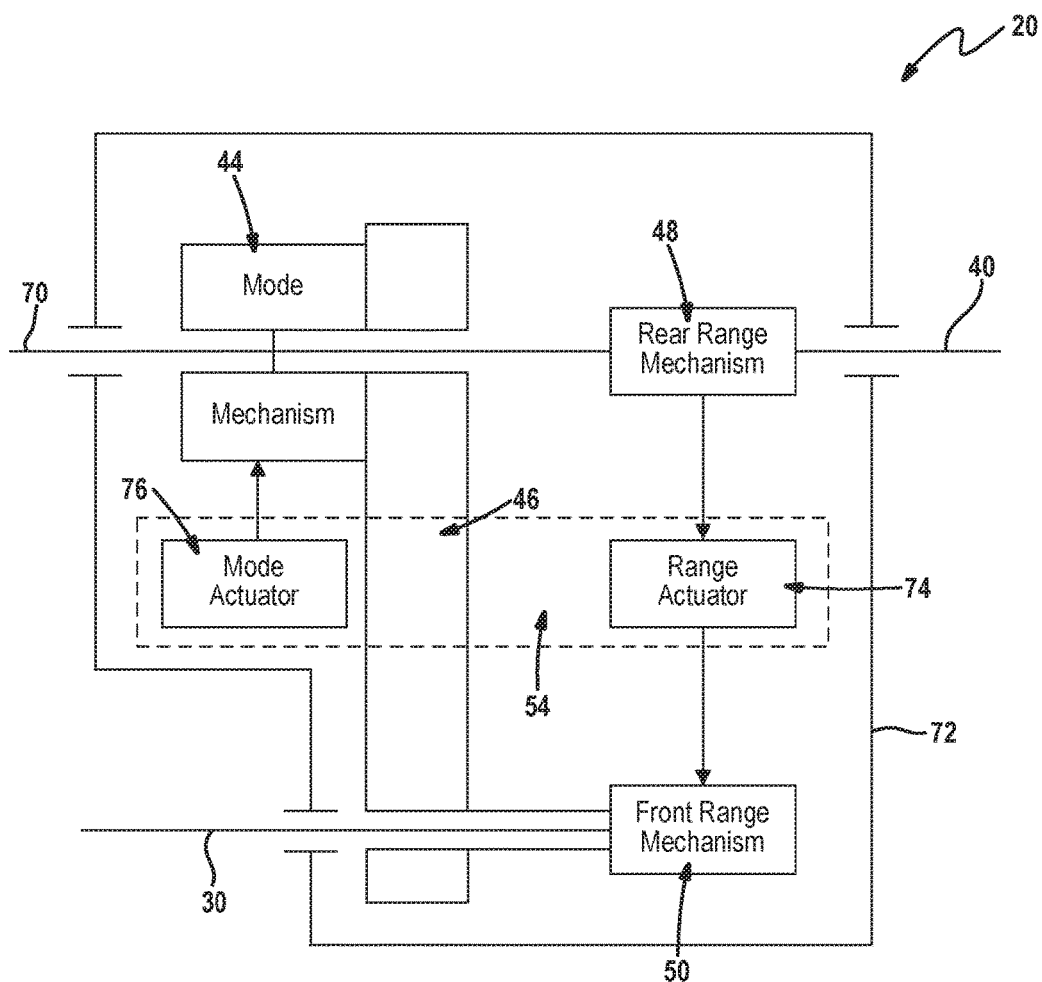
FIG. 2 is a diagrammatical illustration of the heavy-duty transfer case constructed in accordance with the teachings of the present disclosure.

As will be detailed hereinafter with greater specificity, transfer case 20 is generally configured as shown in FIG. 2 to include a mode mechanism 44, a transfer mechanism 46, a rear range mechanism 48, a front range mechanism 50, and a power-operated actuator mechanism 54 for controlling actuation of mode mechanism 44 and front and rear range mechanisms 50, 48. Power transfer system 10 is further shown in FIG. 1 to include an array of sensors 56 arranged and configured for sensing dynamic and operational characteristics of the motor vehicle and generating sensor signals indicative thereof, and a controller 58 for generating control signals in response to the sensor signals. A mode select mechanism 60 permits the vehicle operator to select one of the available drive modes. In particular, controller 58 functions to control actuation of power-operated actuator mechanism 54 in response to the mode signal from mode select mechanism 60 that is indicative of the particular drive mode selected. Additionally, a disconnect clutch 62 is shown associated with one of front axle shafts 25, the operation of which is controlled by a disconnect actuator 64 in response to control signals from controller 58. As is widely understood, disconnect clutch 62 is engaged when drive torque is transmitted to front driveline 12 when one of the available four-wheel drive modes is selected and is released when drive torque is transmitted only to rear driveline 14 when a two-wheel drive mode is selected. As will be detailed, transfer case 20 is configured to permit establishment of a two-wheel high-range (2H) drive mode, a four-wheel high-range (4H) drive mode, and a four-wheel low-range (4L) drive mode.

Referring to FIG. 2, transfer case 20 is diagrammatically shown to include an input shaft or mainshaft 70 that is adapted to be interconnected to an output shaft of transmission 18 and receive the drive torque generated by powertrain 15. Mainshaft 70 and rear output shaft 40 are designed for rotation about a common rotary axis. A transfer case housing 72 is shown generically to enclose and support the components of transfer case 20. As seen, rear range mechanism 48 is operably disposed between mainshaft 70 and rear output shaft 40 and is configured to permit establishment of two distinct speed ratio drive connections therebetween. The distinct speed ratios may include a first or direct speed ratio and a second or reduced speed ratio. A range actuator 74 associated with power-operated actuator mechanism 54 is provided for moving a rear range shift component associated with rear range mechanism 48 to selectively establish the two distinct speed ratio drive connections. Mode mechanism 44 is operably disposed between mainshaft 70 and transfer mechanism 46 and is configured to selectively couple and uncouple transfer mechanism 46 with respect to mainshaft 70 so as to control the transmission of drive torque from mainshaft 70 to transfer mechanism 46. A mode actuator 76, associated with power-operated actuator mechanism 54, is provided for moving a mode shift component associated with mode mechanism 44 to control the transfer of drive torque from mainshaft 70 to transfer mechanism 46. Front range mechanism 50 is operably disposed between transfer mechanism 46 and front output shaft 30 and is configured to permit selective establishment of two distinct speed ratio drive connections therebetween. The distinct speed ratios may include a first or direct speed ratio and a second or reduced speed ratio. Range actuator 74 is shown arranged to also move a front range shift component associated with front range mechanism 50 for selectively establishing the two distinct speed ratio drive connections between transfer mechanism 46 and front output shaft 30. While separate range actuators can be used for each of rear range mechanism 48 and front range mechanism 50, a single or common range shift actuator 74 is shown to indicate coordinated range shifting.

With continued reference to FIG. 2, the establishment of the available drive modes provided by transfer case 20 will now be detailed. The 2H drive mode is established when mode mechanism 44 is in a disengaged or released condition and the direct speed ratio drive connection is established between mainshaft 70 and rear output shaft 40 via rear range mechanism 48 such that all drive torque is transmitted to rear driveline 14. In the 2H drive mode, no drive torque is transmitted from mode mechanism 44 through transfer mechanism 46 and front range mechanism 50 to front output shaft 30. To eliminate possible back driving of the components of front driveline 12, disconnect clutch 62 is disengaged when the 2H drive mode is selected. Preferably, front range mechanism 50 establishes the direct speed ratio drive connection between transfer mechanism 46 and front output shaft 30, despite no drive torque being transmitted thereto, to maintain coordinated establishment of the speed ratios.

When the 4H drive mode is selected, disconnect clutch 62 is engaged and mode mechanism 44 is shifted into an engaged condition so as to transmit drive torque to transfer mechanism 46. The direct speed ratio drive connection is maintained between mainshaft 70 and rear output shaft 40 via rear range mechanism 48 and the direct speed ratio drive connection is either maintained or established between transfer mechanism 46 and front output shaft 30 via front range mechanism 50. Finally, the 4L drive mode is established by maintaining mode mechanism 44 in its engaged condition, establishing the reduced speed ratio drive connection between mainshaft 70 and rear output shaft 40 via rear range mechanism 48, and establishing the reduced speed ratio drive connection between transfer mechanism 46 and front output shaft 30 via front range mechanism 50.

Figure 3:
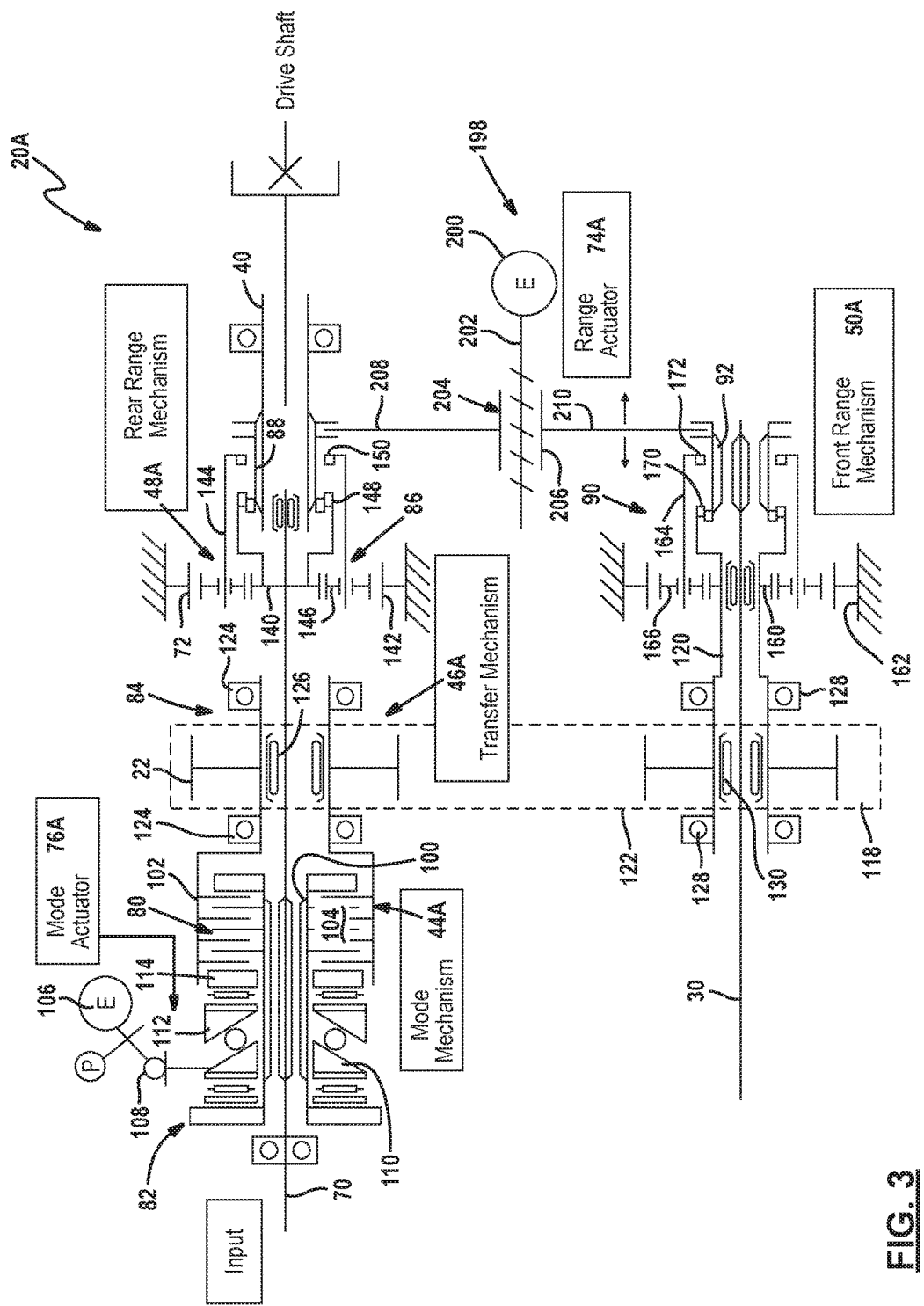
FIGS. 3 and 4 illustrate one embodiment of a heavy-duty transfer case embodying the configuration shown in FIG. 2 and which is constructed in accordance with the teachings of the present disclosure.
Figure 4:
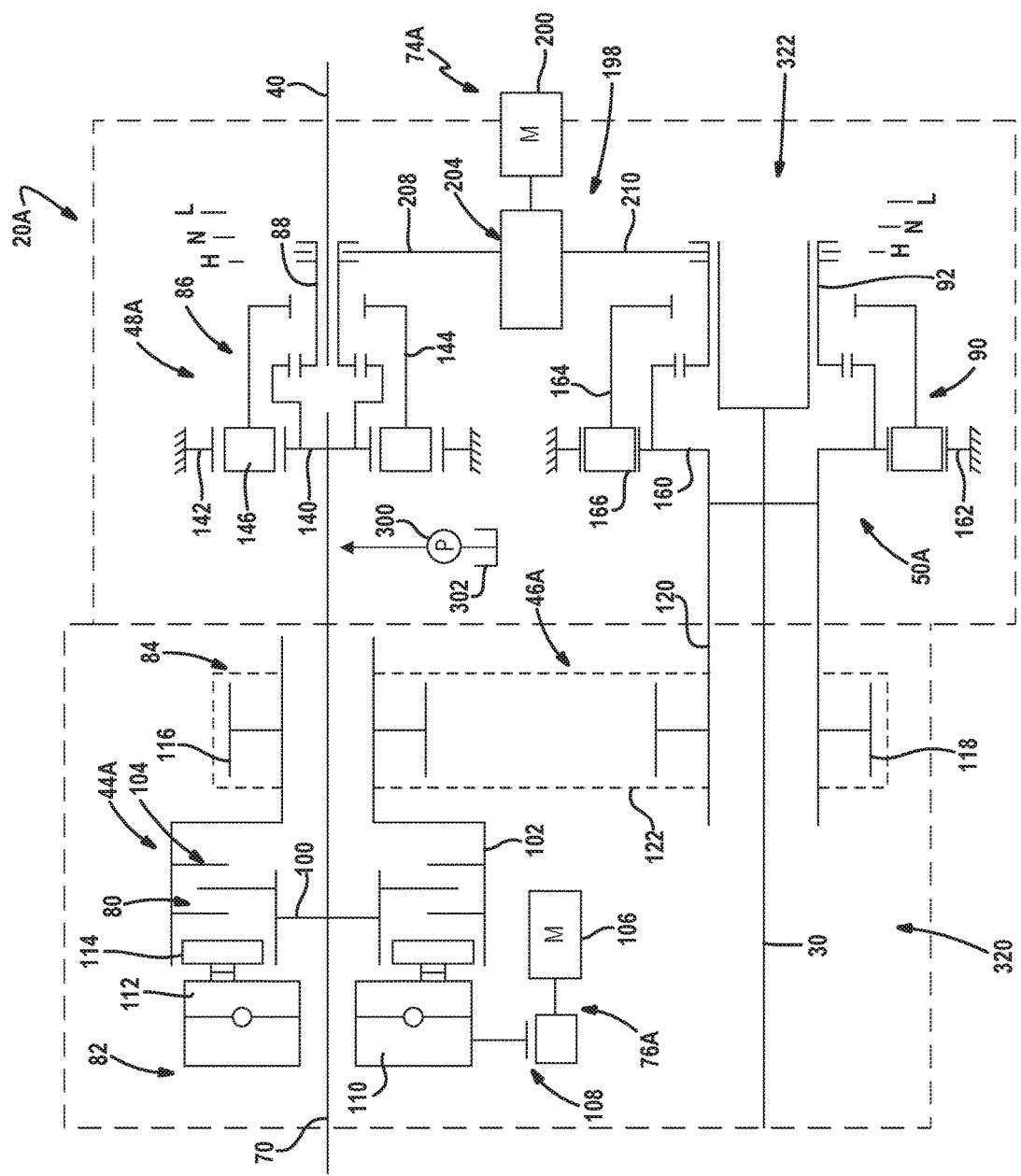

Referring now to FIGS. 3 and 4, a two-speed "on-demand" version of transfer case 20 is shown and identified by reference numeral 20A. Transfer case 20A includes, in this particular non-limiting example, a mode mechanism 44A configured as a multi-plate friction clutch 80 and a mode actuator 76A configured as a motor-driven ball ramp unit 82. Transfer mechanism 46A is configured as a chain drive assembly 84, rear range mechanism 48A is configured to include a rear planetary gearset 86 and a axially-movable rear range collar 88, and front range mechanism 50A is configured to include a front planetary gearset 90 and an axially-moveable front range collar 92. Friction clutch 80 generally includes a clutch hub 100 driven by mainshaft 70, a clutch drum 102, and a multi-plate clutch pack 104 disposed between hub 100 and clutch drum 102. Ball ramp unit 82 includes an electric motor 106 and a gearset 108 configured to rotate at least one of first and second cam plates 110, 112 which, in turn, is converted into linear travel of second cam plate 112. As is understood, linear travel of second cam plate 112 functions to regulate the magnitude of a clutch engagement force exerted by a pressure plate 114 on clutch pack 104 so as to adaptively regulate the amount of drive torque transmitted from mainshaft 70 to clutch drum 102. It will be understood that alternative configurations for mode actuator 76 can be employed in place of motor-driven ball ramp unit 82 for controlling axial movement of pressure plate 114 relative to clutch pack 104. In particular, such alternative versions of mode actuator 76 may include, without limitation, electro-hydraulic actuators, electromagnetic actuators and other electro-mechanical actuators.

Transfer mechanism 46A is shown to include a first transfer component or first sprocket 116 fixed for rotation with clutch drum 102, a second transfer component or second sprocket 118 fixed to a transfer shaft 120, and a third transfer component configured as an endless power chain 122 encircling first sprocket 116 and second sprocket 118. A pair of laterally-spaced ball bearings 124 support first sprocket 116 for rotation relative to housing 72 while a needle bearing 126 supports first sprocket 116 for rotation relative to mainshaft 70. Another pair of laterally-spaced ball bearings 128 rotatably support second sprocket 118 relative to housing 72 and a needle bearing 130 rotatably supports second sprocket 118 relative to front output shaft 30. As an alternative to this chain and sprocket drive system, a gear drive system could be disposed between clutch drum 102 and transfer shaft 120.

As noted, rear range mechanism 48A generally includes rear planetary gearset 86 and rear range collar 88. Planetary gearset 86 includes a sun gear 140 fixed for rotation with mainshaft 70, a ring gear 142 non-rotatably fixed to housing 72, a planet carrier 144, and a plurality of planet gears 146 rotatably supported by carrier 144 and in constant meshed engagement with sun gear 140 and ring gear 142. Sun gear 140 includes a clutch ring section defining internal clutch teeth 148. Similarly, planet carrier 144 includes a clutch ring section having internal clutch teeth 150 that are axially offset from sun gear clutch teeth 148. Rear range collar 88 is splined for rotation with and axially sliding movement on rear output shaft 40 between three range distinct positions including a high-range (H) position, a neutral (N) position, and a low-range (L) position. Rear range collar 88 is shown in FIGS. 3 and 4 located in its H range position.

When rear range collar 88 is located in its H range position, its external clutch teeth 152 meshingly engage with sun gear clutch teeth 148 so as to establish the direct speed ratio drive connection between mainshaft 70 and rear output shaft 40. When rear range collar 88 is located in its L range position, its external clutch teeth 152 meshingly engage with carrier clutch teeth 150 so as to establish the reduced speed ratio drive connection between mainshaft 70 and rear output shaft 40. When located in its intermediate N position, rear range collar teeth 152 are released from engagement with both sun gear clutch teeth 148 and carrier clutch teeth 150 so as to interrupt the drive connection between mainshaft 70 and rear output shaft 40.

Front range mechanism 50A generally includes planetary gearset 90 and front range collar 92. Planetary gearset 90 includes a sun gear 160 fixed for rotation with transfer shaft 120, a ring gear 162 non-rotatably fixed to housing 72, a planet carrier 164, and a plurality of planet gears 166 rotatably supported on planet carrier 164 and in constant meshed engagement with sun gear 160 and ring gear 162. Sun gear 160 or transfer shaft 120 includes a ring segment defining internal clutch teeth, hereinafter sun gear clutch teeth 170. Similarly, carrier 164 includes internal clutch teeth 172 that are axially offset from sun gear teeth 170. Front range collar 92 is splined for rotation with and axially sliding movement on front output shaft 30 between three (3) distinct range positions including a high-range (H) position, a neutral (N) position, and a low-range (L) position. Front range collar 92 is shown located in its H range position.

When front range collar 92 is located in its H range position, its external clutch teeth 174 are meshingly engaged with sun gear clutch teeth 170 so as to establish the direct speed ratio drive connection between transfer shaft 120 and front output shaft 30. When front range collar 92 is located in its L range position, its external clutch teeth 174 are meshingly engaged with carrier clutch teeth 172 so as to establish the reduced speed ratio drive connection between transfer shaft 120 and front output shaft 30. When range collar 92 is located in its N position, its clutch teeth 174 are released from engagement with sun gear clutch teeth 170 and carrier clutch teeth 172 so as to disconnect the drive connection between transfer shaft 120 and front output shaft 30.

Range actuator 74A is shown, in this non-limiting example, to include a motor-driven range shift system 198 having an electric motor 200 rotatably driving an actuator shaft 202. A range fork unit 204 includes an internally-threaded nut segment 206 that is in threaded engagement with an externally-threaded segment of actuator shaft 202 such that the direction of shaft rotation controls axial movement of range fork unit 204. Range fork unit 204 includes a first or rear fork section 208 with a bifurcated end segment retained in an annular groove formed in rear range collar 88, and a second or front fork section 210 with a bifurcated end segment retained in an annular groove formed in front range collar 92. Thus, axial movement of range fork unit 204 in response to rotation of actuator shaft 202 results in coordinated axial movement of rear range collar 88 and front range collar 92 between their respective H, N and L range positions. As noted, range actuator 74A is a non-limiting example and is intended to represent any available arrangement or device capable of controlling axial sliding movement of range collars 88 and 92. It will be understood that alternative configurations for range actuator 74 can be employed in place of motor-driven range shift system 198 for controlling coordinated axial movement of rear range collar 88 and front range collar 92 between their respective H, N and L range positions. In particular, such alternative versions of range actuator 74 may include, without limitation, electro-hydraulic actuators, electromagnetic actuators and other electro-mechanical actuators. A pair of separate and distinct front and rear range actuators can be used to provide independent movement of the range collars if required or desired.

Transfer case 20A is capable of establishing three different four-wheel drive modes in addition to the 2H drive mode. These include a on-demand 4H drive (AUTO-4H) mode, a locked 4H drive (LOCK-4H) mode, and a locked 4L drive (LOCK-4L) mode. When the AUTO-4H mode is selected, the amount of drive torque transmitted from mainshaft 70 to front output shaft 30 can be adaptive controlled by regulating the magnitude of a clutch engagement force applied by pressure plate 114 to clutch pack 104 based on road conditions and/or vehicle operating characteristics, as detected by sensors 56. In both of the LOCK-4H and LOCK-4L drive modes, friction clutch 80 is fully-engage or "locked up" to prevent slip across clutch pack 104. A mechanical mode lock (mode collar) can be used to mechanically couple hub 100 to drum 102, or mechanically couple first sprocket 116 to mainshaft 70, so as to permit release of clutch pack 104 following establishment of the locked mode if such an optional arrangement is desired.

Figure 5:
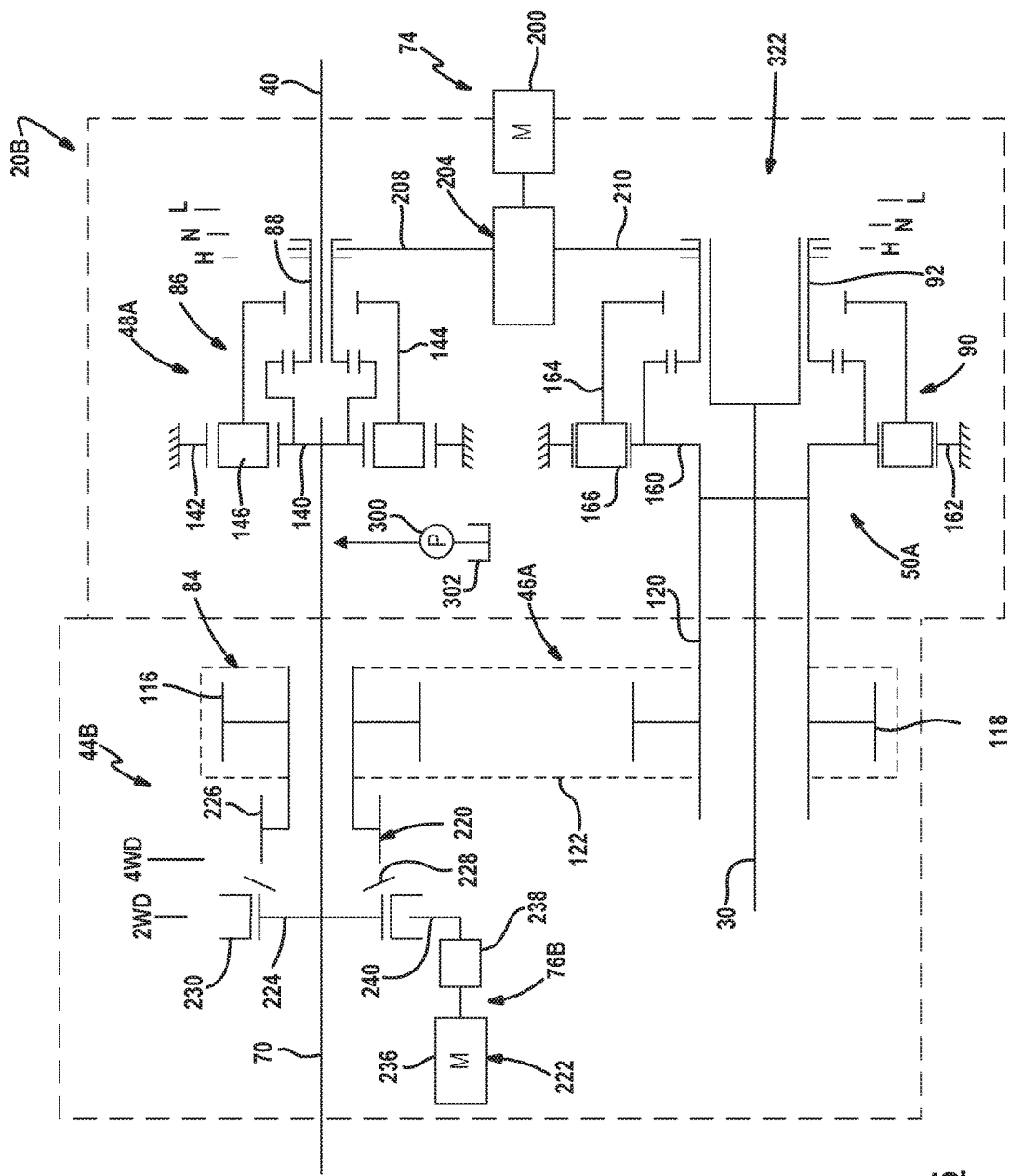
FIG. 5 illustrates another embodiment of a heavy-duty transfer case embodying the configuration shown in FIG. 2 and which is constructed in accordance with the teachings of the present disclosure.

Referring now to FIG. 5, an alternative configuration for transfer case 20 is identified as transfer case 20B. In general, transfer case 20B is identical to transfer case 20A (FIG. 4) except that mode mechanism 44B is now a synchronized mode clutch 220 instead of friction clutch 80, while mode actuator 76B is now a motor-driven mode shift mechanism 222 instead of motor-driven ball ramp unit 82. Synchronized mode clutch 220 includes a clutch hub 224 fixed to mainshaft 70, a clutch ring 226 fixed to first sprocket 116, a synchronizer 228, and an axially-moveable mode collar 230.

Mode collar 230 is splined for rotation with and axial movement on clutch hub 224. Mode collar 230 is axially moveable via motor-driven mode shaft mechanism 222 between a first or 2WD position and a second or 4WD position. When in its 2WD position, mode collar 230 is released from engagement with clutch ring 226 such that no drive torque is transferred from mainshaft 70 to first sprocket 116. Accordingly, all drive torque is directed to rear output shaft 40 (via rear range mechanism 48A) to establish the 2H drive mode. In contrast, mode collar 230 functions to couple first sprocket 116 for common rotation with mainshaft 70 when located in its 4WD position. The LOCK-4H and LOCK-4L drive modes are available when mode collar 230 is located in its 4WD position. Motor-driven mode shift mechanism 222 includes an electric motor 236 and a rotary-to-linear conversion device 238 configured to axially move a mode fork 240 for controlling translational movement of mode collar 230 between its 2WD and 4WD positions. Conversion device 238 is intended to represent any suitable arrangement operable to convert the rotary output of electric motor 236 into a translational input applied to mode fork 240.

As an option to the on-demand version of mode mechanism 44A and the synchronized dog-clutch version of mode mechanism 44B, it is contemplated that other arrangements can be employed to selectively interconnect mainshaft 70 to transfer shaft 120. For example, a non-synchronized version of a dog type mode clutch can be employed. As another option, a selectably actuatable overrunning clutch could be employed. It is further contemplated that an interaxle differential unit could be employed to interconnect mainshaft 70 to first sprocket 116 and an intermediate shaft (not shown) aligned with mainshaft 70 and rear output shaft 40 and to which sun gear 140 is fixed for rotation. Specifically, the interaxle differential unit would include a differential input component fixed for rotation with mainshaft, a first differential output component fixed for rotation with first sprocket 116, a second differential output component fixed for rotation with the intermediate shaft, and a gearset configured to interconnect the differential input component to the first and second differential output components to facilitate torque transfer and speed differentiation therebetween. The interaxle differential unit could be disposed generally between first sprocket 116 and first planetary gearset 86. In such an arrangement, mode mechanism 44 and mode actuator 76 would provide a variable limited slip feature (using friction clutch 80) or an open/locked feature (using mode clutch 220). The interaxle differential unit would provide full-time four-wheel high-range and low-range drive modes. Those skilled in the power transfer art will recognize that other available options are available in addition to the non-limiting examples disclosed herein.

Those skilled in the art will recognize and appreciate that a single power-operated shift system can be integrated into transfer cases 20A, 20B to coordinate actuation of the mode mechanisms and the front and rear range mechanisms as an alternative to the individual actuators shown and described. It is further contemplated that the mode and range actuators could be any suitable electrohydraulic, electromechanical, electromagnetic, linear actuator, ballscrew and/or camming system capable of use in the transfer case and transmission art to meet required packaging and power requirements.

FIG. 4 also illustrates transfer case 20A further including a lubrication pump 300 for pumping a lubricant from a sump 302 to components aligned on the rotary axis associated with mainshaft 70, mode mechanism 44, transfer mechanism 46 and rear range mechanism 48. Pump 300 can be a shaft-driven device or a stand-alone electric lube pump. Splash of lubricant from rotation of front output shaft 30 and second sprocket 118 is used to lubricate the components aligned on the rotary axis associated with front output shaft 30 and front range mechanism 50.

The present disclosure provides a solution for creating a heavy-duty transfer case using available, high volume, regular-duty and/or medium-duty components, commonly referred to as "platform" components. Specifically, the location of mode mechanism 44 and transfer mechanism 46 prior (i.e. upstream) of the power flow to range mechanisms 48 and 50 isolates mode mechanism 44 and transfer mechanism 46 from the high output torques typically required from a heavy duty transfer case. Thus, current platform or otherwise available components, sub-assemblies and mechanisms currently in production can be reconfigured to provide a unique solution for heavy duty requirements. This utilization of smaller, lower weight components results in lower mass and improved fuel efficiency for the motor vehicle equipped with the transfer cases of the present invention.

The present disclosure encompasses a transfer case having a low-torque power transfer section 320 providing a power split from mainshaft 70 into a front power path and a rear power path. A high-torque power transfer section 322 of the transfer case 20 provides a two-speed range shift system in each of the front and rear power paths. Actuation of the two distinct two-speed range shift systems must be coordinated to provide establishment of the desired high-range and low-range drive connections.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A transfer case for use in a motor vehicle having a powertrain and front and rear drivelines, the transfer case comprising:
   a mainshaft adapted to receive drive torque from the powertrain;
   a rear output shaft adapted to be connected to the rear driveline;
   a front output shaft adapted to be connected to the front driveline;
   a transfer mechanism having a first transfer component rotatably supported on said mainshaft and a second transfer component rotatably supported on said front output shaft, said first and second transfer components being drivingly interconnected for common rotation;
   a mode clutch operable in a first mode to disconnect said first transfer component from said mainshaft and in a second mode to connect said first transfer component to said mainshaft;
   a mode actuator for controlling shifting of said mode clutch between its first and second modes;
   a rear planetary gearset having a first component driven directly by said mainshaft and a second component driven at a reduced speed relative to said mainshaft;
   a rear range collar drivingly connected to said rear output shaft and moveable between first and second range positions relative to said rear planetary gearset, said rear range collar operable in its first range position to establish a drive connection between said first component of said rear planetary gearset and said rear output shaft and is further operable in its second range position to establish a drive connection between said second component of said rear planetary gearset and said rear output shaft;
   a front planetary gearset having a first component driven directly by said second transfer component and a second component driven at a reduced speed relative to said second transfer component;
   a front range collar drivingly connected to said front output shaft and moveable between first and second range positions relative to said front planetary gearset, said first range collar operable in its first range position to establish a drive connection between said first component of said front planetary gearset and said front output shaft and is further operable in its second range position to establish a drive connection between said second component of said front planetary gearset and said front output shaft; and
   a range actuator operable for controlling coordinated movement of said rear range collar and said front range collar between their respective first and second range positions.

2. The transfer case of claim 1 wherein said range actuator is a single power-operated mechanism configured to cause coordinated movement of said front range collar and said rear range collar between their respective first and second range positions.

3. The transfer case of claim 1 wherein said range actuator includes a front range actuator for controlling movement of said front range collar and a rear range actuator for controlling movement of said rear range collar.

4. The transfer case of claim 1 wherein said mode clutch is a multi-plate friction clutch operably disposed between said mainshaft and said first transfer component, and wherein said mode actuator is a power-operated device configured to control variable engagement of said friction clutch.

5. The transfer case of claim 1 wherein said mode clutch is a dog clutch operably disposed between said mainshaft and said first transfer component, and wherein said mode actuator operates to move said dog clutch between a first position disconnecting said first transfer component from said mainshaft and a second position connecting said first transfer component for rotation with said mainshaft.

\* \* \* \* \*